(12) United States Patent
Marudaimani (10) Patent No.: US 9,948,768 B1
(45) Date of Patent: Apr. 17, 2018

(54) METHOD AND SYSTEM FOR ACCESSING CALL INFORMATION COMMUNICATED OVER A CELLULAR TELEPHONE NETWORK

(71) Applicant: Accenture Global Solutions Limited, Dublin (IE)

(72) Inventor: Muralidharan Marudaimani, Newbury (GB)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/601,660

(22) Filed: May 22, 2017

(51) Int. Cl.
*H04M 1/24* (2006.01)
*H04M 3/08* (2006.01)
*H04M 3/22* (2006.01)
*H04M 1/725* (2006.01)
*G06F 17/30* (2006.01)
*H04W 88/06* (2009.01)

(52) U.S. Cl.
CPC .......... *H04M 3/2218* (2013.01); *G06F 17/30* (2013.01); *H04M 1/72583* (2013.01); *H04W 88/06* (2013.01); *H04M 2201/42* (2013.01); *H04M 2250/60* (2013.01)

(58) Field of Classification Search
USPC .............................. 379/32.01, 35; 348/14.01
See application file for complete search history.

(56) References Cited

U.S. PATENT DOCUMENTS

| | | | | |
|---|---|---|---|---|
| 6,438,695 | B1 * | 8/2002 | Maufer | H04L 63/0272 379/35 |
| 8,891,739 | B2 * | 11/2014 | Anchan | H04M 3/2281 370/260 |
| 2003/0200311 | A1 * | 10/2003 | Baum | H04L 29/12122 709/224 |
| 2010/0235453 | A1 * | 9/2010 | Attanasio | H04L 51/04 709/206 |
| 2017/0251279 | A1 * | 8/2017 | Grant | H04N 21/812 |

* cited by examiner

*Primary Examiner* — Quoc D Tran
(74) *Attorney, Agent, or Firm* — Brinks Gilson & Lione (57) ABSTRACT

A method for accessing call information communicated between a source terminal and a target terminal over a carrier network is provided. The method includes receiving, at a real-time duplication server (RTDS), context information specified by a user of the source terminal that defines information to be communicated to the target terminal prior to establishment of an audio/visual call between the source terminal and target terminal. The method also includes converting, by the RTDS, the context information into a visual representation of the context information; and communicating, by the RTDS, the visual representation of the context information to a user.

20 Claims, 7 Drawing Sheets

METHOD AND SYSTEM FOR ACCESSING CALL INFORMATION COMMUNICATED OVER A CELLULAR TELEPHONE NETWORK

BACKGROUND

Field

This application generally relates to communication networks. In particular, this application describes a method and system for accessing call information communicated over a cellular telephone network, WIFI network or a different type of communication network.

Description of Related Art

Interception of communications between calling devices is often requested by legal enforcement agencies (LEA) when building a case against an individual. For example, the LEA may obtain a court order to compel a carrier to forward information associated with a mobile device, fixed-line phone, pager, fax machine, or any other type of telecommunication device. The information may include numbers called by from the mobile device along with timestamps associated with the calls.

In some instances, the LEA may request real-time access to the communications from the mobile device. This allows the LEA to determine a number being called at the time the call is placed. In addition, audio and/or video data associated with the call may be forwarded by the carrier to the LEA. This allows the LEA to listen in on conversations.

Upcoming 5G networks will be all IP based and will support additional types of interactivity between mobile devices before and during a call such as sketch sharing, chatting, sharing of locations, etc. Unfortunately, no mechanism exist for gaining access to this information.

BRIEF SUMMARY

In one aspect, a method for accessing call information communicated between a source terminal and a target terminal over a carrier network is provided. The method includes receiving, at a real-time duplication server (RTDS), context information specified by a user of the source terminal that defines information to be communicated to the target terminal prior to establishment of an audio/visual call between the source terminal and target terminal. The method also includes converting, by the RTDS, the context information into a visual representation of the context information; and communicating, by the RTDS, the visual representation of the context information to a user.

In a second aspect, a system for accessing call information communicated between a source terminal and a target terminal over a carrier network includes a carrier network interface and a duplication server. The carrier network interface includes non-transitory computer readable media includes instruction code for causing the carrier network interface to receive context information specified by a user of the source terminal that defines information to be communicated to the target terminal prior to establishment of an audio/visual call between the source terminal and target terminal. The duplication server includes non-transitory computer readable media that includes instruction code for causing the duplication server to convert the context information into a visual representation of the context information; and communicate the visual representation of the context information to a user.

In a third aspect, a non-transitory computer readable medium is provided that has instruction code stored therein for accessing call information communicated between a source terminal and a target terminal over a carrier network. The instruction code is executable by a machine for causing the machine to perform acts including receiving context information specified by a user of the source terminal that defines information to be communicated to the target terminal prior to establishment of an audio/visual call between the source terminal and target terminal; converting the context information into a visual representation of the context information; and communicating the visual representation of the context information to a user.

DETAILED DESCRIPTION

Figure 1:
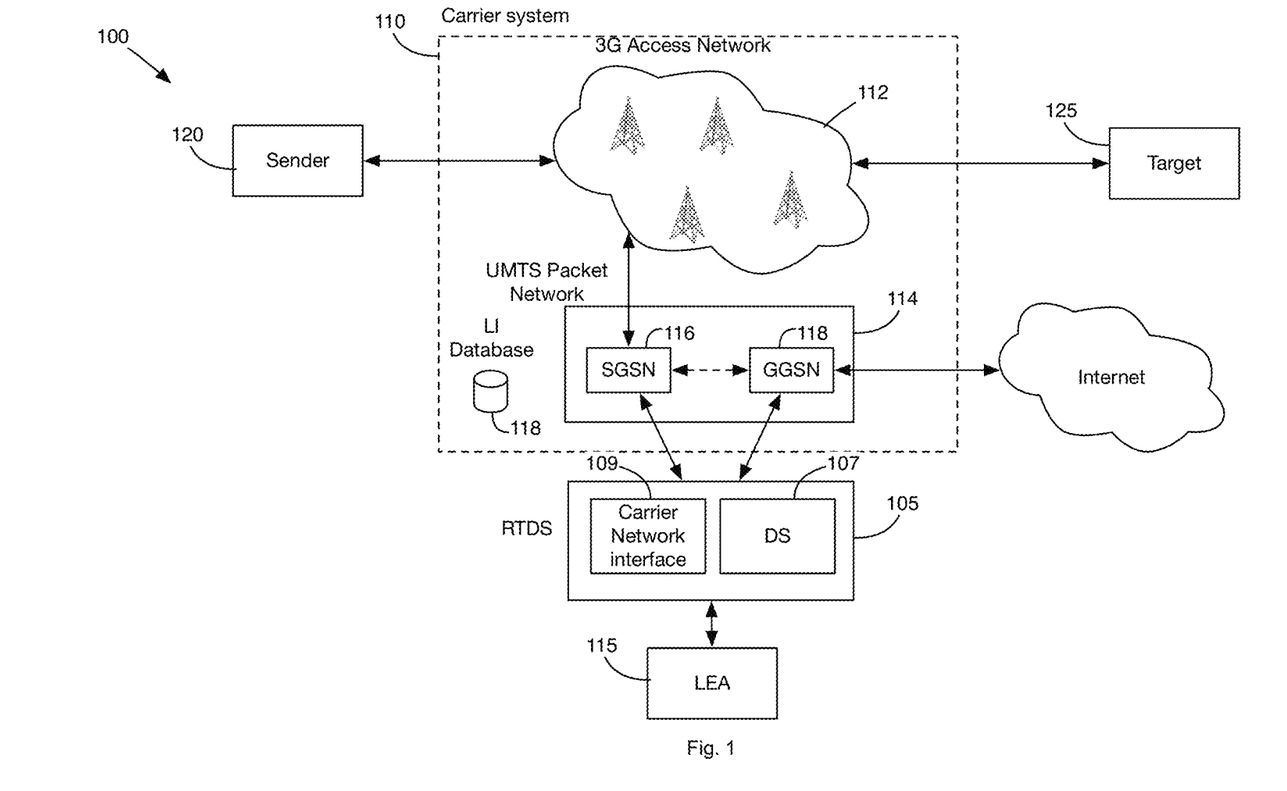
FIG. 1 illustrates data traffic in an exemplary cellular communication environment in an embodiment.

FIG. 1 illustrates an exemplary cellular communication environment 100. Illustrated in the environment 100 are entities that include a real-time duplication system (RTDS) 105, a carrier system 110, an interception system, a lawful enforcement agency (LEA) server 115, a sending terminal 120, and a target terminal 125. The carrier system 110 includes a 3G access network 112 and a UMTS packet network 114. The RTDS 105 includes a carrier network interface 109 and duplication server 107.

The entities generally correspond to computer systems configured, for example, as terminals, servers, communication data relays, etc. Each entity may include one or more network interfaces that facilitate communications via a network such as the 3G access network, Internet, etc. Each computer system may correspond to an Intel®, AMD®, or PowerPC® based computer or a different computer. The computer systems may include an operating system, such as, a Microsoft Windows®, Linux, Unix® or other operating system.

The entities may also include additional processors and/or circuitry that facilitate performance of the various operations described herein. Terminal and server entities may include additional processors and/or circuitry that facilitate implementation of web server/browsing functionality for generating and viewing web pages that allow for user interaction with the terminal and server entities.

Generally, under circumstances where interception of information is not required, communication between the sending terminal 120 and target terminal 125 occur as follows: The sending terminal 120 communicates information with the 3G access network 112. The 3G access network 112 communicates the information to the UMTS packet network 114. Specifically, the 3G access network 112 communicates the information to a serving GPRS support node 116 (SGSN) of the UMTS packet network 114. The SGSN 116 communicates the information to a gateway GPRS support node (GGSN) 118 of the UMTS packet network 114 as illustrated by the dashed lines between the SGSN 116 and the GGSN 118. The GGSN 118 communicates the information to the 3G access network 112. Finally, the 3G access network 112 communicates the information to the target terminal 125. Other entities, not necessarily germane to the claims, may be involved in the communication of information between the sending terminal 120 and the target terminal 125.

Operations performed by one or more of the entities of the environment 100 are illustrated in FIGS. 2, 3, 5, and 6. In this regard, the operations may be implemented via instruction code stored in non-transitory computer readable media that resides within the entities configured to cause the respective entities to perform the operations in the figures.

Figure 2:
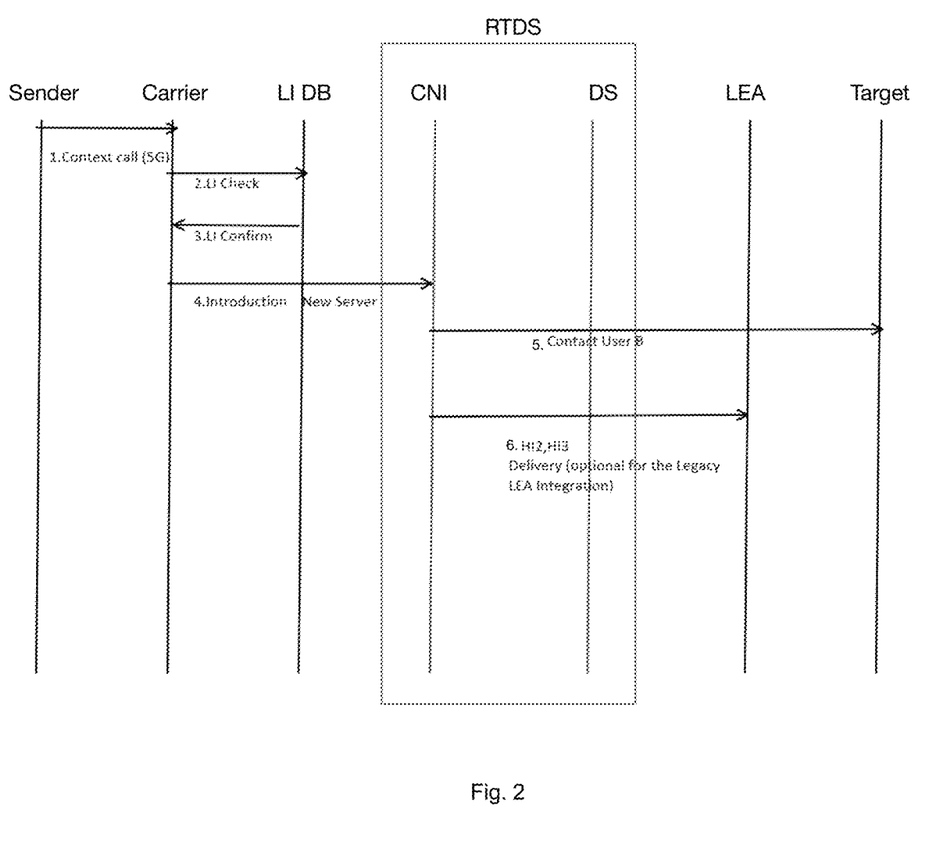
FIG. 2 illustrates operations performed by entities of the environment in a first interception scenario.

FIG. 2 illustrates operations performed by the entities of the environment 100 in a first interception scenario. In the first interception scenario, a lawful enforcement agency (LEA) is interested in interception of information such as the number of the person the sending terminal is calling and the conversation of the call. Prior to performance of the operations, the LEA server 115 may have communicated instructions to the carrier system 110 to request interception of communications from the sending terminal 120. In addition, the carrier system 110 may have been configured to communicate with the RTDS 105 to facilitate interception requests by the LEA server 115.

In addition or alternatively, the LEA server 115 may have communicated instructions to the RTDS 105 to request interception of certain types of communications from the sending terminal 120. In this case, the information requested may include the number of the person the sending terminal is calling and the conversation of the call. The RTDS 105 in turn may have communicated instructions to the carrier system 110 to request interception of communications from the sending terminal 120.

At step 1, a sending terminal 120 may initiate a request with the carrier system 110 to communicate with the target terminal 125. For example, a user of the sending terminal 120 may dial a number associated with the target terminal 125.

At step 2, the carrier system 110 may search a lawful interception (LI) database 118 of the carrier system 110 to determine whether a request has been made by an LEA server 115 to intercept communications associated with the sending terminal 120. In this regard, a record associated with the sending terminal 120 may have been entered into the LI database 118 after the LEA server 115 requested interception of communications of the sending terminal 120. Table 1 illustrates an exemplary record associated with the sending terminal 120 that might be stored in the LI database 118.

| Sender ID | Address of RTDS | Address of LEA server | Duration of interception |
|---|---|---|---|
| 123456 | 111.115.205.100 | 222.215.105.060 | Jan. 1, 2017-Mar. 1, 2017 |

The sender ID field may correspond a telephone number, IMSI, or other information that uniquely identifies the sending terminal 120. The RTDS address field may correspond to a network address of the RTDS 105 that facilitates network communication with the RTDS 105. The LEA server address field may correspond to a network address of the LEA server 115 that facilitates network communication with the LEA server 115. The Duration of interception field may specify a duration over which communications by the sending terminal 120 should be intercepted. Other fields may be provided in the record.

If at step 3, the carrier system 110 determines that an ID associated with the sending terminal 120 is stored in the LI database 118, then at step 4, the carrier system 110 may forward some or all communications of the sending terminal 120 to the RTDS 105. In this regard, in an exemplary implementation, the communications may be forwarded by the SGSN 116 of the UMTS packet network 114 of the carrier system 110 to the carrier network interface (CNI) 109 of the RTDS 105. For example, the number dialed by the user of the sending terminal may be forwarded by the SGSN 116. Context information specified by the user may be forwarded by SGSN 116. For example, information specified by the user such as the subject of the call, a short description to be sent with the call, an importance of the call, etc., may be forwarded by the SGSN 116 to the CNI 109 of the RTDS 105. Other information such as the location of the sending terminal 120 may be forwarded.

At step 5, the RTDS 105, or more specifically the CNI 109 of the RTDS 105, may forward communications received from the SGSN 116 that are associated with the sending terminal 120 to the target terminal 125. For example, the CNI 109 of the RTDS 105 may forward the context information to the target terminal 125. Afterwards, the user of the target terminal 125 may answer the call. In this case, all subsequent information (e.g., voice, video, etc.) communicated between the sending terminal 120 and the target terminal 125 may be routed through the CNI 109 of the RTDS 105.

At step 6, the CNI 109 may simultaneously forward the communication information requested by the LEA server 115 to the LEA server 115. In the first scenario, the communication information would include the number dialed by the sending terminal. If the user of the target terminal 125 answers the call, any voice or video information communicated between the sending terminal 120 and the target terminal 125 may be communicated to the LEA server 115.

Figure 3:
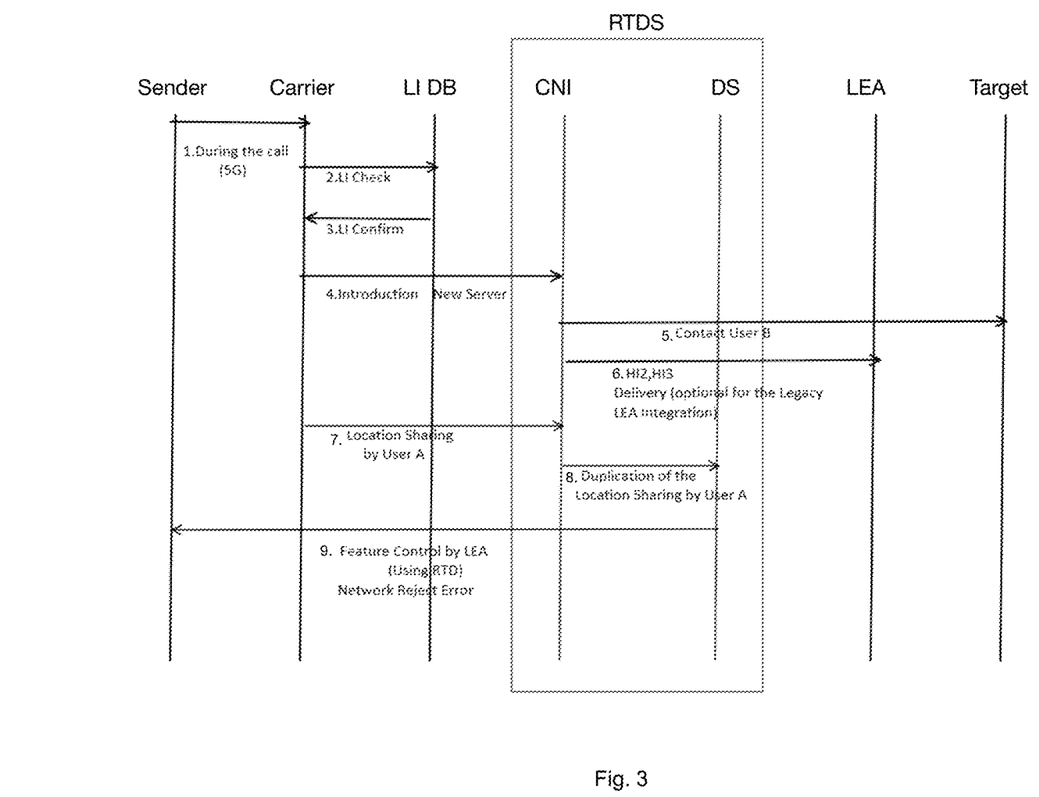
FIG. 3 illustrates operations performed by the entities of the environment in a second interception scenario.

FIG. 3 illustrates operations performed by the entities of the environment 100 in a second interception scenario. In the second interception scenario, an LEA is interested in interception of context information specified by a user of the sending terminal 120 along with, for example, the number of the person the sending terminal is calling and the conversation of the call. As before, prior to performance of the operations, the LEA server 115 may have communicated instructions to the carrier system 110 to request interception of communications from the sending terminal 120 and/or communicated instructions to the RTDS 105 to request interception of certain types of communications from the sending terminal 120. In this case, the information requested includes the context information, the number of the person the sending terminal is calling and the conversation of the call. Other information may be requested.

Steps 1-6 are similar to steps 1-6 of FIG. 2, the operations of which will not be repeated for brevity.

At step 7, context information specified by the user of the sending terminal 120 may be processed by the duplication server 107 of the RTDS 105 to facilitate determining, by a user, the content communicated in the context information. For example, the duplication server 107 may extract the text from the subject and short description sent with the call. The duplication server 107 may also extract data associated with the importance of the call and location information associated with the sending terminal 120. Other data specified in the context information may be extracted.

Figure 4:
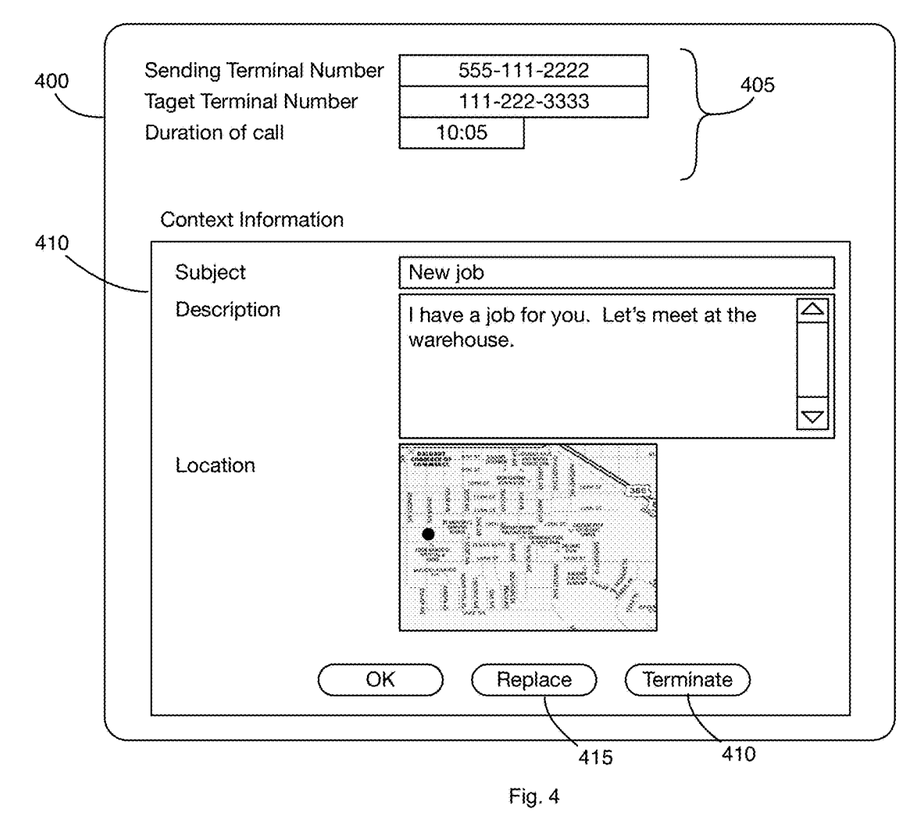
FIG. 4 illustrates an exemplary graphical user interface (GUI) that may be generated by a duplication server of the environment.

The duplication server 107 may then generate a graphical user interface (GUI) to convey the information specified in the context information. FIG. 4 illustrates an exemplary GUI 400 that may be generated by the duplication server 107.

Referring to FIG. 4, the GUI 400 may include non-context information 405 such as the phone number of the sending terminal and the target terminal 125 and the duration of the call. The GUI 500 may also include context information 410, which corresponds to additional information provided by the user of the sending terminal 120 when establishing the call. For example, a subject and description may be displayed. In addition, the location of the sending terminal 120 may be represented by, for example, a map with a cursor depicting the location of the sending terminal 120 on the map.

The duplication server 107 may implement web server functionality to facilitate user interaction with the GUI 400 via a web browser. For example, an official at the LEA may, via a web browser at the LEA, navigate to a website address associated with the duplication server 107 to view GUI 400.

In addition to being able to view context information, the GUI may be configured to facilitate preventing the communication of the context information to the target terminal 125. For example, the GUI may include a Terminate control 410 to allow the official at the LEA to block the communication of the context information. Termination of the communication may be appropriate in cases where, for example, the information to be communicated relates to the performance of some nefarious activity.

Figure 5:
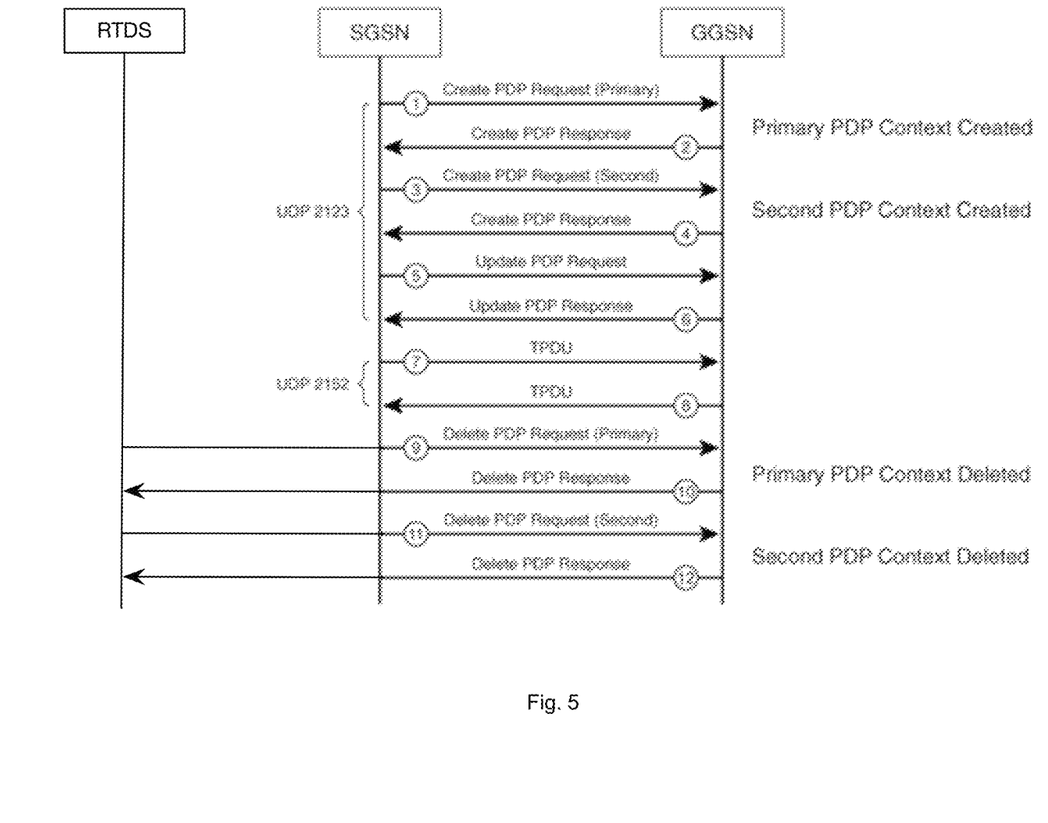
FIG. 5 illustrates exemplary operations for preventing the communication of context information.

Referring to FIG. 5, in one implementation, so as not to arouse suspicion that the communication is being monitored, the context information may be blocked by sending a delete packet data protocol (PDP) request to the GGSN 118. For example, upon receiving an indication that the context information should be blocked, the RTDS 105 may send first and second delete PDP requests to the GGSN 118. (See steps 9-12 in FIG. 5). This results in the sending terminal 120 and/or the target terminal 125 receiving a network error message. Thus, the user of the sending terminal 120 and/or the target terminal 125 may simply believe that problems with the network are preventing communication of the context information.

In addition to blocking context information, the GUI may be configured to facilitate modifying the context information before sending the context information to the target terminal 125. For example, the GUI may include a Replace control 415 to allow the official at the LEA to replace the context information with content specified by the official. In this regard, the GUI may allow not only viewing the context information, but may also editing of the context information. Modification of the context information may be appropriate in cases where, for example, the LEA is trying to capture the user of the target terminal 125. For example, an officer at the LEA may modify the short description of the context information to instruct the user of the target terminal 125 to go to a specific location where it so happens that agents are waiting for him.

Figure 6:
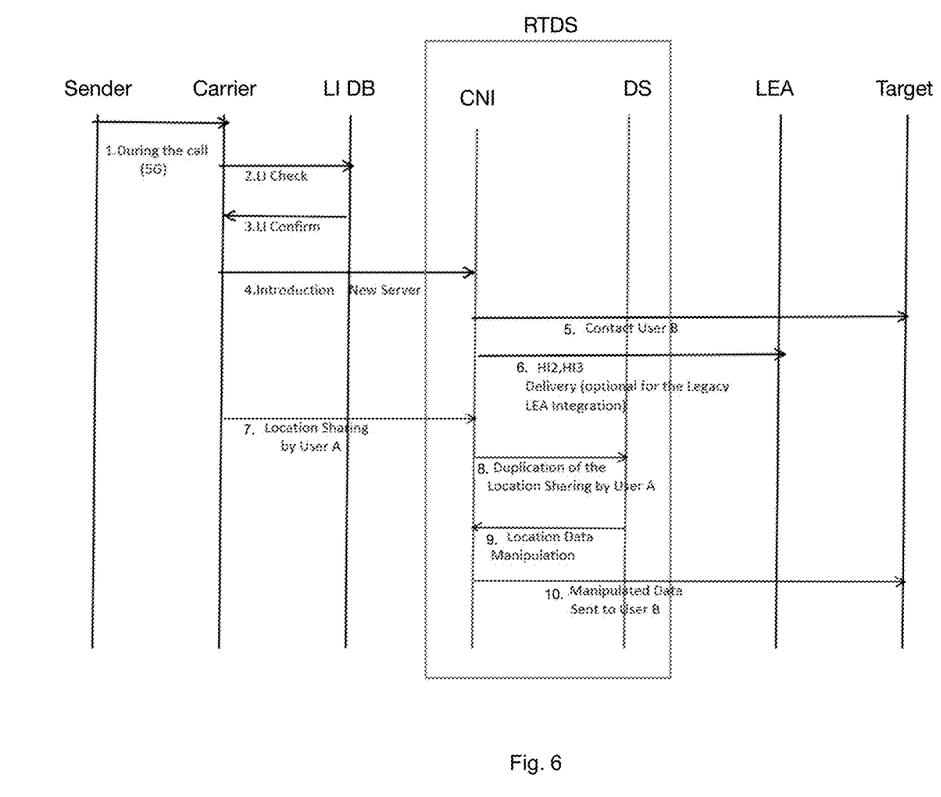
FIG. 6 illustrates exemplary operations for communicating modified context information.

FIG. 6 illustrates exemplary operations for communicating the modified context information to the target terminal 125.

Steps 1-8 are similar to steps 1-8 of FIG. 3, the operations of which will not be repeated for brevity.

At step 9, the modified context information may be converted into a format suitable for communication via the carrier network. Modification may be performed by either the duplication server 107 or the CNI 109.

At step 10, the converted modified context information may be communicated to the target terminal 125. More specifically, the CNI 109 may communicate the converted modified context information to the GGSN 118 of the carrier system 110. The GGSN 118 may in turn communicate the converted modified context information to the 3G access network 112 of the carrier system 110, which in turn communicates the converted modified context information to the target terminal 125.

Figure 7:
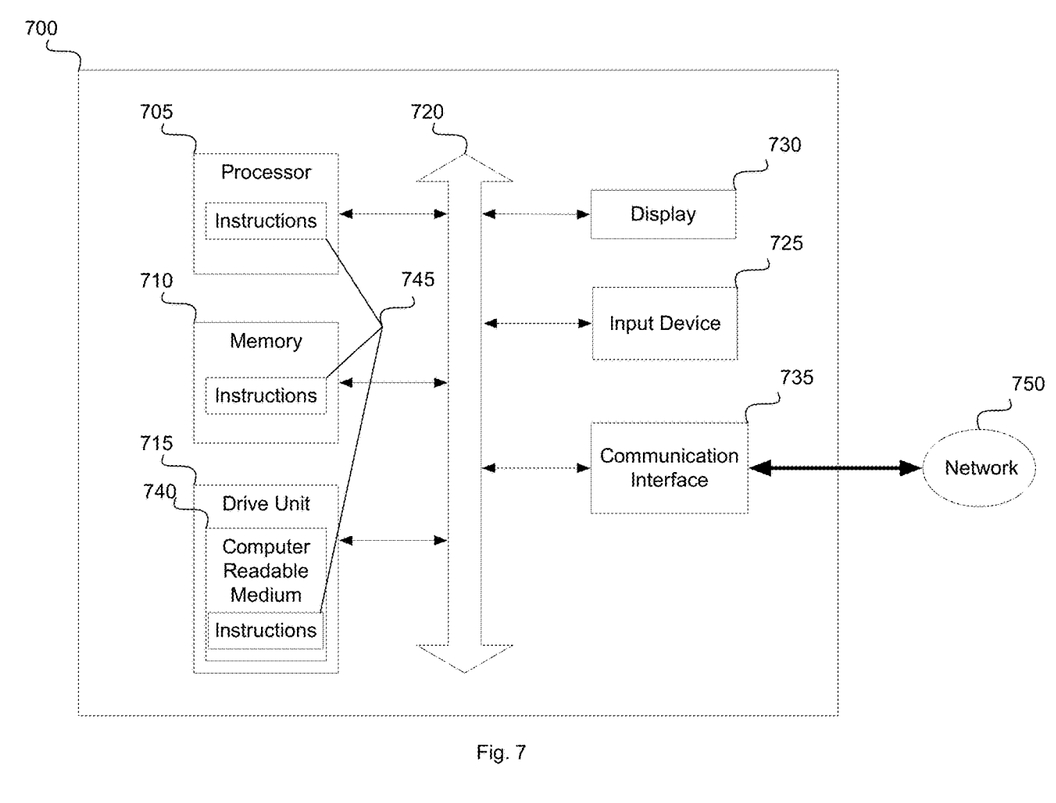
FIG. 7 illustrates an exemplary computer system that may form part of or implement the systems described in the figures or in the following paragraphs.

FIG. 7 illustrates a computer system 700 that may form part of or implement the systems described above. The computer system 700 may include a set of instructions 745 that the processor 705 may execute to cause the computer system 700 to perform any of the operations described above. The computer system 700 may operate as a standalone device or may be connected, e.g., using a network, to other computer systems or peripheral devices.

In a networked deployment, the computer system 700 may operate in the capacity of a server or as a client-user computer in a server-client user network environment, or as a peer computer system in a peer-to-peer (or distributed) network environment. The computer system 700 may also be implemented as or incorporated into various devices, such as a personal computer or a mobile device, capable of executing the instructions 745 (sequential or otherwise) that specify actions to be taken by that machine. Further, each of the systems described may include any collection of subsystems that individually or jointly execute a set, or multiple sets, of instructions to perform one or more computer functions.

The computer system 700 may include one or more memory devices 710 on a bus 720 for communicating information. In addition, code operable to cause the computer system to perform any of the operations described above may be stored in the memory 710. The memory 710 may be a random-access memory, read-only memory, programmable memory, hard disk drive or any other type of memory or storage device.

The computer system 700 may include a display 730, such as a liquid crystal display (LCD), a cathode ray tube (CRT), or any other display suitable for conveying information. The display 730 may act as an interface for the user to see the functioning of the processor 705, or specifically as an interface with the software stored in the memory 710 or in the drive unit 715.

Additionally, the computer system 700 may include an input device 725, such as a keyboard or mouse, configured to allow a user to interact with any of the components of system 700.

The computer system 700 may also include a disk or optical drive unit 715. The disk drive unit 715 may include a computer-readable medium 740 in which the instructions 745 may be stored. The instructions 745 may reside completely, or at least partially, within the memory 710 and/or within the processor 705 during execution by the computer system 700. The memory 710 and the processor 705 also may include computer-readable media as discussed above.

The computer system 700 may include a communication interface 735 to support communications via a network 750. The network 750 may include wired networks, wireless networks, or combinations thereof. The communication interface 735 network may enable communications via any number of communication standards, such as 802.11, 802.12, 802.20, WiMAX, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope of the claims. For example, the methods and systems may be applied to 4G, 5G, or future radio access technologies In the 4G case, the methods and systems may be adapted to use a serving gateway (SGW) and a packet data network gateway (PGW) instead of an SGSN and GGSN, respectively. Corresponding entities of a 5G network may be utilized to adapt the methods and systems to 5G networks. Therefore, it is intended that the present methods and systems not be limited to the particular embodiment disclosed, but that the disclosed methods and systems include all embodiments falling within the scope of the appended claims.

I claim:

1. A method for accessing call information communicated between a source terminal and a target terminal over a carrier network, the method comprising:
    receiving, at a real-time duplication server (RTDS), context information specified by a user of the source terminal that defines information to be communicated to the target terminal prior to establishment of an audio/visual call between the source terminal and target terminal;
    converting, by the RTDS, the context information into a visual representation of the context information; and
    communicating, by the RTDS, the visual representation of the context information to a user.

2. The method according to claim 1, wherein the context information specifies one or more of: subject information associated with the call, location information associated with the call, a short description associated with the call, an importance of the call.

3. The method according to claim 1, further comprising:
    receiving, by the RTDS, an instruction to prevent the context information from reaching the target; and
    communicating, by the RTDS to the carrier network, an instruction to terminate communication of the context information, wherein the carrier network subsequently blocks the context information from being communicated to the target terminal.

4. The method according to claim 3, wherein the carrier network is one of a general packet radio service (GPRS) network and a universal mobile telecommunications system (UMTS) network, and wherein communicating the instruction to terminate communication of the context information comprises communicating, by the RTDS, an instruction to a serving GPRS support Node (SGSN) of the carrier network to delete a packed data protocol (PDP) request initiated by the source terminal.

5. The method according to claim 1, wherein the carrier network is one of a general packet radio service (GPRS) network and a universal mobile telecommunications system (UMTS) network, and wherein the context information is communicated between a SGSN and gateway GPRS support node (GGSN), wherein the method further comprises:
    communicating, by the RTDS, a request to intercept information communicated by the source terminal, wherein in response to the request, the carrier network routes the context information communicated between the SGSN and the GGSN through the RTDS.

6. The method according to claim 5, further comprising:
    receiving, by the RTDS, replacement context information; and
    communicating, by the RTDS, the replacement context information to the GGSN so that the target terminal receives the replacement context information rather than the context information communicated by the source terminal.

7. The method according to claim 1, further comprising:
    implementing, by the RTDS, a web server;
    generating, by the RTDS, a web page for conveying the visual representation of the context information; and
    communicating the web page to the user.

8. A system for accessing call information communicated between a source terminal and a target terminal over a carrier network, the system comprising:
    a carrier network interface;
    first non-transitory computer readable media that includes instruction code for causing the carrier network interface to receive context information specified by a user of the source terminal that defines information to be communicated to the target terminal prior to establishment of an audio/visual call between the source terminal and target terminal;
    a duplication server in communication with the carrier network interface;
    second non-transitory computer readable media that includes instruction code for causing the duplication server to convert the context information into a visual representation of the context information; and communicate the visual representation of the context information to a user.

9. The system according to claim 8, wherein the context information specifies one or more of: subject information associated with the call, location information associated with the call, a short description associated with the call, an importance of the call.

10. The system according to claim 8, wherein the second non-transitory computer readable media includes instruction code for causing the duplication server to receive an instruction to prevent the context information from reaching the target; and
    the first non-transitory computer readable media includes instruction code for causing the carrier network interface to communicate to the carrier network an instruction to terminate communication of the context information, wherein the carrier network subsequently blocks the context information from being communicated to the target terminal.

11. The system according to claim 10, wherein the carrier network is one of a general packet radio service (GPRS) network and a universal mobile telecommunications system (UMTS) network, and wherein the first non-transitory computer readable media includes instruction code for causing the carrier network interface to communicate an instruction to a serving GPRS support Node (SGSN) of the carrier network to delete a packed data protocol (PDP) request initiated by the source terminal.

12. The system according to claim 8, wherein the carrier network is one of a general packet radio service (GPRS) network and a universal mobile telecommunications system (UMTS) network, and wherein the context information is communicated between a SGSN and gateway GPRS support node (GGSN), wherein the first non-transitory computer readable media includes instruction code for causing the carrier network interface to communicate a request to intercept information communicated by the source terminal, wherein in response to the request, the carrier network routes the context information communicated between the SGSN and the GGSN through the RTDS.

13. The system according to claim 12, wherein second the non-transitory computer readable media includes instruction code for causing the duplication server to receive replacement context information and communicate the replacement context information to the carrier network interface
wherein first the non-transitory computer readable media includes instruction code for causing the carrier network interface to communicate the replacement context information to the GGSN so that the target terminal receives the replacement context information rather than the context information communicated by the source terminal.

14. The system according to claim 8, wherein the second non-transitory computer readable media includes instruction code for causing the duplication server to:
implement a web server;
generate a web page for conveying the visual representation of the context information; and
communicate the web page to the user.

15. A non-transitory computer readable medium having instruction code stored therein for accessing call information communicated between a source terminal and a target terminal over a carrier network, the instruction code being executable by a machine for causing the machine to perform acts comprising:
receiving context information specified by a user of the source terminal that defines information to be communicated to the target terminal prior to establishment of an audio/visual call between the source terminal and target terminal;
converting the context information into a visual representation of the context information; and
communicating the visual representation of the context information to a user.

16. The non-transitory computer readable medium according to claim 15, wherein the context information specifies one or more of: subject information associated with the call, location information associated with the call, a short description associated with the call, an importance of the call.

17. The non-transitory computer readable medium according to claim 15, wherein the instruction code is further executable by the machine to cause the machine to perform acts comprising:
receiving an instruction to prevent the context information from reaching the target; and
communicating to the carrier network an instruction to terminate communication of the context information, wherein the carrier network subsequently blocks the context information from being communicated to the target terminal.

18. The non-transitory computer readable medium according to claim 17, wherein the carrier network is one of a general packet radio service (GPRS) network and a universal mobile telecommunications system (UMTS) network, and wherein the instruction code is further executable by the machine to cause the machine to perform acts comprising communicating an instruction to a serving GPRS support Node (SGSN) of the carrier network to delete a packed data protocol (PDP) request initiated by the source terminal.

19. The non-transitory computer readable medium according to claim 15, wherein the carrier network is one of a general packet radio service (GPRS) network and a universal mobile telecommunications system (UMTS) network, and wherein the context information is communicated between a SGSN and gateway GPRS support node (GGSN), wherein the instruction code is further executable by the machine to cause the machine to perform acts comprising:
communicating a request to intercept information communicated by the source terminal, wherein in response to the request, the carrier network routes the context information communicated between the SGSN and the GGSN through the RTDS.

20. The non-transitory computer readable medium according to claim 19, wherein the instruction code is further executable by the machine to cause the machine to perform acts comprising:
receiving replacement context information; and
communicating the replacement context information to the GGSN so that the target terminal receives the replacement context information rather than the context information communicated by the source terminal.

* * * * *